US009123350B2

(12) United States Patent
Zhao

(10) Patent No.: US 9,123,350 B2
(45) Date of Patent: Sep. 1, 2015

(54) METHOD AND SYSTEM FOR EXTRACTING AUDIO FEATURES FROM AN ENCODED BITSTREAM FOR AUDIO CLASSIFICATION

(75) Inventor: Ying Zhao, Singapore (SG)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 1957 days.

(21) Appl. No.: 12/097,198

(22) PCT Filed: Dec. 14, 2005

(86) PCT No.: PCT/SG2005/000419
§ 371 (c)(1),
(2), (4) Date: Feb. 17, 2009

(87) PCT Pub. No.: WO2007/070007
PCT Pub. Date: Jun. 21, 2007

(65) Prior Publication Data
US 2009/0254352 A1 Oct. 8, 2009

(51) Int. Cl.
*G10L 21/00* (2013.01)
*G10L 25/00* (2013.01)
*G10L 25/78* (2013.01)
*G10L 25/18* (2013.01)
*G10L 25/51* (2013.01)
(Continued)

(52) U.S. Cl.
CPC .......... *G10L 25/78* (2013.01); *G10H 2240/051* (2013.01); *G10H 2250/225* (2013.01); *G10H 2250/235* (2013.01); *G10L 15/02* (2013.01); *G10L 19/022* (2013.01); *G10L 25/18* (2013.01); *G10L 25/51* (2013.01)

(58) Field of Classification Search
CPC ..... G10L 19/00; G10L 19/0019; G10L 19/02; G10L 19/022; G10L 19/18; G10L 21/072; G10L 21/028; G10L 21/00; G10L 25/00; G10L 25/18; G10L 25/51; G10L 25/54; G10L 25/78; G10L 2025/00; G10L 2025/78; G10L 2025/93
USPC .......................................... 704/205, 230, 500
See application file for complete search history.

(56) References Cited

U.S. PATENT DOCUMENTS

| 6,389,392 B1* | 5/2002 | Pawlewski et al. ............ 704/241 |
| 6,704,704 B1* | 3/2004 | Newson et al. ................ 704/225 |
| 6,785,645 B2* | 8/2004 | Khalil et al. ................... 704/216 |

(Continued)

FOREIGN PATENT DOCUMENTS

| WO | WO 2004/049188 A1 | 6/2004 |
| WO | WO 2005/122135 A1 | 12/2005 |

OTHER PUBLICATIONS

Chih-Chin Liu and Chuan-Sung Huang. 2002. A singer identification technique for content-based classification of MP3 music objects. In Proceedings of the eleventh international conference on Information and knowledge management (CIKM '02). ACM, New York, NY, USA, 438-445.*

(Continued)

*Primary Examiner* — Paras D Shah
(74) *Attorney, Agent, or Firm* — Christensen Fonder P.A.

(57) ABSTRACT

A method and system for extracting audio features from an encoded bitstream for audio classification. The method comprises partially decoding the encoded bitstream; obtaining uniform window block size spectral coefficients of the encoded bitstream; and extracting audio features based on the uniform window block spectral coefficients.

14 Claims, 8 Drawing Sheets

(51) Int. Cl.
*G10L 15/02* (2006.01)
*G10L 19/022* (2013.01)

(56) References Cited

U.S. PATENT DOCUMENTS

| | | | |
|---|---|---|---|
| 7,321,851 B2* | 1/2008 | Andrsen et al. | 704/211 |
| 7,389,230 B1* | 6/2008 | Nelken | 704/255 |
| 7,395,209 B1* | 7/2008 | Mesarovic et al. | 704/500 |
| 8,140,329 B2* | 3/2012 | Zhang et al. | 704/237 |
| 2003/0045953 A1* | 3/2003 | Weare | 700/94 |
| 2005/0038651 A1* | 2/2005 | Zhang et al. | 704/233 |
| 2005/0159942 A1* | 7/2005 | Singhal | 704/219 |
| 2006/0069550 A1* | 3/2006 | Todd et al. | 704/212 |
| 2006/0167698 A1* | 7/2006 | Puterbaugh et al. | 704/277 |
| 2006/0200344 A1* | 9/2006 | Kosek et al. | 704/226 |
| 2006/0217988 A1* | 9/2006 | Sukkar et al. | 704/500 |

OTHER PUBLICATIONS

Ying, Zhao et al., "Device for Audio Clip Classification," Patent Specification, Panasonic Singapore Laboratories Pte Ltd, Jan. 18, 2005.

Slaney, Malcolm, "Auditory Toolbox," Version 2, Technical Report #1998-010, Interval Research Corporation (1998).

Logan, Beth, et al., "Music Summarization Using Key Phrases," *IEEE International Conference on Acoustics, Speech and Signal Processing*, Orlando, USA, vol. 2, pp. 749-752 (Jun. 2000).

"Real Time Audio Capture FFT Fast Fourier Transform Frequency Domain Representation With Plotting," *Science Shareware*, (Dec. 2003).

* cited by examiner

METHOD AND SYSTEM FOR EXTRACTING AUDIO FEATURES FROM AN ENCODED BITSTREAM FOR AUDIO CLASSIFICATION

FIELD OF INVENTION

The present invention relates to a method and system for extracting audio features from an encoded bitstream for audio classification and to a data storage device containing computer readable code means for instructing a computer system to execute a method for extracting audio features from an encoded bitstream for audio classification.

BACKGROUND

Automatic audio classification is a means of classifying a full audio clip or a segment of an audio clip into one of a set of predefined classes without human intervention. The predefined classes used depend on the type of application involved that requires audio classification. For example, the classes can be speech/non-speech or speech/music/cheers or the like.

There are four steps in a typical automatic audio classification system.

In the first step, pre-processing is performed on the audio bitstream to streamline all the audio clips in the audio bitstream to the same stream format.

The second step usually involves feature extraction where various audio features are extracted in time domain, spectral domain or cepstral domain. Typical audio features include Mel Frequency Cepstral Coefficients (MFCC), spectrum centroid, zero crossing rate or the like. Most classification systems resort to multiple features with complementary performances. The audio features may be combined to form a feature vector that can represent the content of a segment in an audio clip. The basic features can further undergo statistical calculation to be refined or derive additional features.

In the third step, the feature vectors are automatically classified by a set of trained classifiers.

Lastly, the fourth step, post-processing, further improves the classification results.

In conventional feature extraction, if audio content in the audio bitstream is in compressed or encoded format, the audio bitstream will usually be fully decoded into audible time domain Pulse Code Modulation (PCM) data before the extraction of audio features from the audio bitstream. However, full decoding process usually involves the conversion of frequency domain coefficients into time domain, which is time consuming and results in unnecessary computations.

For example, for an AAC (Advanced Audio Codec) encoded bitstream, Inverse Modified Discrete Cosine Transform (IMDCT) and windowing have to be performed for each frame of the bitstream to transform the frequency domain coefficients, for instance MDCT spectral coefficients, into time domain. At the last step of the conversion, neighbouring frames must be overlapped and added to restore the time domain PCM data. However, in some cases, audio features are actually calculated with frequency domain coefficients and not calculated from time domain PCM data. Hence, the time domain PCM data has to be divided into frames again and for each frame, windowing and Fast Fourier Transform (FFT) have to be applied to transform each frame to the frequency domain.

In order to avoid the unnecessary computations, it has been suggested to use MDCT spectral coefficients, which are the intermediate outputs during decoding process, instead of FFT spectral coefficients for classification. However, current useful audio features such as MFCC and spectrum centroid are derived from FFT spectral coefficients and not based on MDCT spectral coefficients, which may be because of problems in deriving audio features from MDCT spectral coefficients. Encoded bitstreams, for example an AAC bitstream, typically consist of both long window blocks and short window blocks. A long window may e.g. be represented by 1024 MDCT spectral coefficients while a short window may be represented by 128 MDCT spectral coefficients. Long window blocks achieve high frequency resolution with sacrifice in time resolution while short window blocks achieve high time accuracy with sacrifice in frequency resolution. Although AAC codec can benefit from this long/short window switching strategy to achieve optimal balance between frequency resolution and time resolution, the variance of dimension of MDCT spectral coefficients makes it difficult to consistently interpret all the blocks. Thus, derivation of audio features from MDCT spectral coefficients becomes difficult.

A need therefore exists to provide a method and system for extracting audio features from an encoded bitstream for audio classification that addresses at least one of the above-mentioned problems.

SUMMARY

In accordance with an aspect of the present invention, there is provided a method for extracting audio features from an encoded bitstream for audio classification, the method comprising: partially decoding the encoded bitstream; obtaining uniform window block size spectral coefficients of the encoded bitstream; and extracting audio features based on the uniform window block spectral coefficients.

The obtaining the uniform window block size spectral coefficients may comprise expanding dimensions of short window block size spectral coefficients of the encoded bitstream to dimensions of long window block size spectral coefficients of the encoded bitstream so as to obtain uniform window block size spectral coefficients.

The extracting of the audio features may comprise subjecting the uniform window block spectral coefficients to a filter bank; and applying a discrete cosine transform to extract quasi-Mel Frequency Cepstral Coefficients (quasi-MFCC).

The extracting of the audio features may comprise calculating a global spectrum centroid based on the uniform window block spectral coefficients; and deriving a Successive Lower Centroid (SLC) feature by reducing a spectrum range of the global spectrum centroid to a range based on a predefined convergence threshold.

The Centroid-Centroid Deviation feature may be calculated by taking a difference between the global spectrum centroid and the Successive Lower Centroid.

The encoded bitstream may be encoded by an Advanced Audio Codec (AAC).

The encoded bitstream may be encoded by Adaptive Transform Acoustic Coding (ATRAC).

The encoded bitstream may be encoded by Digital Audio Compression (AC-3).

The obtaining the uniform window block size spectral coefficients may comprise representing a short window block in the encoded bitstream by a mean value of absolute spectral coefficients over all the short windows in said short window block.

The obtaining the uniform window block size spectral coefficients may comprise utilising interpolation techniques to expand dimensions of short window block size spectral coefficients to dimensions of long window block size spectral coefficients.

The dimensions of the short window block size spectral coefficients of the encoded bitstream may be expanded from 128 to 1024.

The spectral coefficients may comprise Modified Discrete Cosine Transform (MDCT) spectral coefficients.

The spectral coefficients may comprise Fast Fourier Transform (FFT) spectral coefficients.

In accordance with another aspect of the present invention, there is provided a system for extracting audio features from an encoded bitstream for audio classification, the system comprising: a decoder for partially decoding the encoded bitstream; a processor for obtaining uniform window block size spectral coefficients of the encoded bitstream; and an audio feature extractor for extracting audio features based on the uniform window block spectral coefficients.

The processor may expand dimensions of short window block size spectral coefficients of the encoded bitstream to dimensions of long window block size spectral coefficients of the encoded bitstream so as to obtain uniform window block size spectral coefficients.

The audio feature extractor may comprise a filter bank for filtering the uniform window block spectral coefficients; and the processor applies discrete cosine transform to extract quasi-Mel Frequency Cepstral Coefficients (quasi-MFCC).

The audio feature extractor may calculate a global spectrum centroid based on the uniform window block spectral coefficients and derives a Successive Lower Centroid (SLC) feature by reducing a spectrum range of the global spectrum centroid to a range based on a predefined convergence threshold.

The audio feature extractor may further calculate a Centroid-Centroid Deviation feature by taking a difference between the global spectrum centroid and the Successive Lower Centroid.

The encoded bitstream may be encoded by an Advanced Audio Codec (AAC).

The encoded bitstream may be encoded by Adaptive Transform Acoustic Coding (ATRAC).

The encoded bitstream may be encoded by Digital Audio Compression (AC-3).

The processor may represent a short window block in the encoded bitstream is represented by a mean value of absolute spectral coefficients over all short windows in said short window block.

The processor may utilise interpolation techniques to expand dimensions of short window block size spectral coefficients to dimensions of long window block size spectral coefficients.

The short window block size spectral coefficients of the encoded bitstream may be expanded from 128 to 1024.

The spectral coefficients may comprise Modified Discrete Cosine Transform (MDCT) spectral coefficients.

The spectral coefficients may comprise Fast Fourier Transform (FFT) spectral coefficients.

In accordance with yet another aspect of the present invention, there is provided a data storage device containing computer readable code means for instructing a computer system to execute a method for extracting audio features from an encoded bitstream for audio classification, the method comprising: partially decoding the encoded bitstream; obtaining uniform window block size spectral coefficients of the encoded bitstream; and extracting audio features based on the uniform window block spectral coefficients.

BRIEF DESCRIPTION OF THE DRAWINGS

Embodiments of the invention will be better understood and readily apparent to one of ordinary skill in the art from the following written description, by way of example only and in conjunction with the drawings, in which.

DETAILED DESCRIPTION

Figure 1:
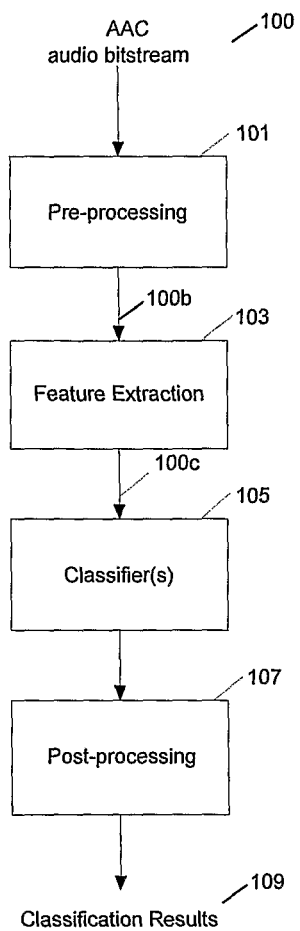
FIG. 1 shows a flow chart illustrating a method of audio classification according to the example embodiments of the present invention.

An example embodiment of the present invention with reference to FIG. 1 comprises steps for classifying an Advanced Audio Codec (AAC) encoded audio bitstream 100 (hereinafter denoted as AAC bitstream 100) into different types of audio classes such as music, speech, cheers or the like. AAC bitstream 100 is used for illustration purposes in the example embodiment. It is appreciated that other suitable bitstreams such as those that operate on frequency domain spectral coefficients, for example, Adaptive Transform Acoustic Coding (ATRAC), Digital Audio Compression (AC-3) or the like may be utilised.

The AAC bitstream 100 may first be pre-processed at an optional step 101 to streamline all the audio clips within the AAC bitstream 100 to the same stream format such as sampling frequency, bit rate or the like before audio features representative of the content or part of the content of the AAC bitstream 100 are extracted for audio classification. Additional processing such as low-pass filtering, band-pass filtering or pre-emphasis filtering may be applied at step 101 if required.

At step 103, the pre-processed AAC encoded audio bitstream 100b, or the AAC encoded audio bitstream 100 (if step 101 is skipped), undergoes audio feature extraction. Step 103 involves partially decoding the AAC encoded audio bitstream 100b (or 100) to obtain uniform window block size Modified Discrete Cosine Transform (MDCT) spectral coefficients of the AAC encoded bitstream 100b (or 100), followed by extracting audio features based on the uniform window block Modified Discrete Cosine Transform (MDCT) spectral coefficients. The extracted audio features, which are represented by matrices in the example embodiment, can be combined to form one or more feature vectors 100c that are representative of the content of a segment in an audio clip within the AAC bitstream 100. The feature vectors 100c may further undergo statistical calculation to be refined or be used to derive more audio features and feature vectors 100c.

As mentioned above, step 103 obtains the MDCT spectral coefficients of uniformly sized window blocks. The example embodiment applies a process for converting spectral coefficients of differently sized window blocks into the spectral coefficients of uniformly sized window blocks. This can advantageously provide spectral coefficients that are useful for audio classification without requiring full decoding of the encoded bitstream.

At step 105, various feature vectors 100c representative of various corresponding audio segments in the AAC bitstream are processed by a set of trained classifiers during audio classification. Before being put to use, the classifiers are trained using training datasets to acquire optimal model parameters, which will be used in classifying unseen segments of the AAC bitstream 100. It is appreciated that classifiers used by the example embodiment may be Gaussian Mixture Model, Support Vector Machine or the like. In the simplest case, the classification results 109 produced by the classifiers are directly presented to end-users. However, an optional step 107 of post-processing may be added to further improve the classification results 109.

Figure 2:
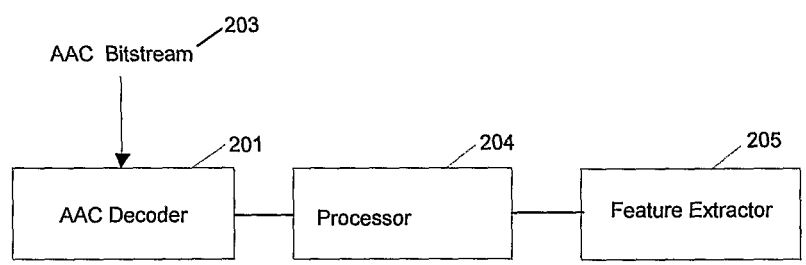
FIG. 2 illustrates a system for feature extraction according to the example embodiments of the present invention.

With reference to FIG. 2, a system according to the example embodiment comprises an AAC Decoder 201 for performing partial decoding on the AAC bitstream 203 and a processor 204 to obtain uniform window block size MDCT spectral coefficients. Details of the partial decoding and the obtaining of the uniform window block size spectral coefficients will be provided with reference to FIGS. 3 and 4.

The system also comprises an audio feature extractor 205 for extracting audio features. The audio feature extractor 205 carries out a procedure to calculate an audio feature that is similar to traditional Mel Frequency Cepstral Coefficients (MFCC) from the uniform window block size MDCT spectral coefficients obtained during partial decoding. This audio feature is hereinafter denoted as quasi-MFCC.

The audio feature extractor 205 may further carry out other procedures to calculate audio features from the uniform window block size MDCT spectral coefficients, such as Successive Lower Centroid (SLC) and a Centroid-Centroid Deviation (CCD) that is derived from SLC. SLC and CCD advantageously function as alternative or complementary audio features to, for example, quasi-MFCC, traditional MFCC or the like. SLC and CCD can also be calculated based on FFT spectral coefficients.

Therefore, example embodiments can advantageously provide a plurality of audio features derived from MDCT spectral coefficients without resorting to derivation from FFT spectral coefficients.

Figure 3:
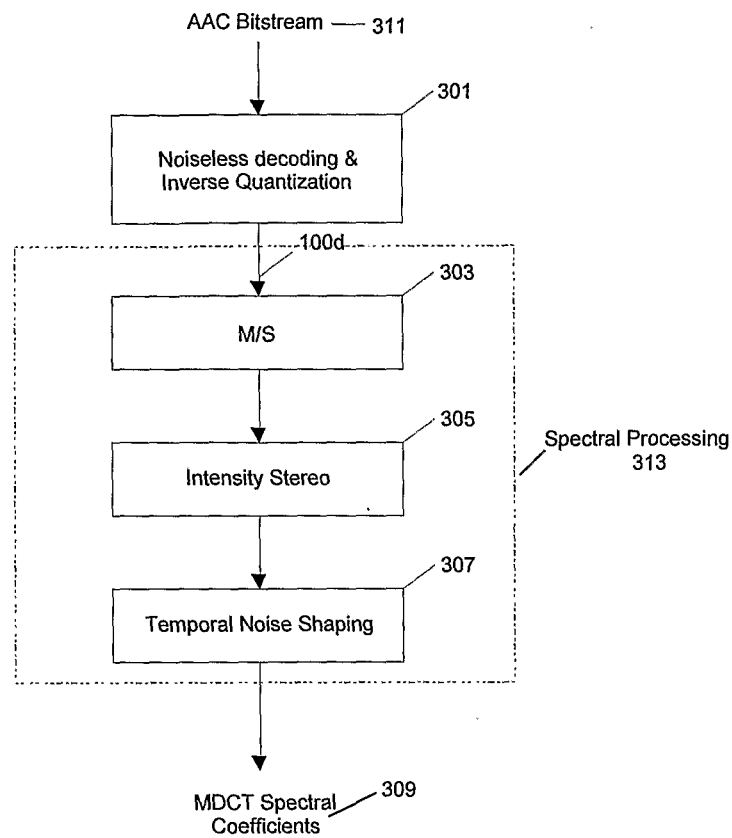
FIG. 3 shows a flow chart illustrating a partial decoding process for MPEG-2 Low Complexity (LC) profile according to the example embodiments of the present invention.

FIG. 3 shows the partial decoding process of the example embodiment for a MPEG-2 Low Complexity (LC) profile. It is appreciated that other suitable profiles may be used.

The AAC bitstream 311 first undergoes noiseless decoding and is inversely quantized at step 301, which involves Huffman decoding, inverse quantization and rescaling.

Following that is a series of spectral processing steps 313 on the output AAC bitstream 100d of step 301 such as spectra pair conversion 303 from Mid/Side (M/S) to Left/Right, intensity stereo decoding 305 and temporal noise shaping 307. The output of the spectral processing steps 313 are MDCT spectral coefficients 309. These spectral processing steps 313 may be enabled or disabled according to the control bits of the AAC bitstream 311.

Before describing the features of processing the MDCT spectral coefficients 309 to obtain uniform window block size MDCT spectral coefficients, for better understanding, some parts of the audio encoding will first be described.

During the encoding of an AAC bitstream, a AAC codec encodes time domain audio signals in the AAC bitstream based on blocks (or frames), each block covers 2048 time domain audio signals, which can be converted to 1024 MDCT spectral coefficients in equivalence. The neighbouring blocks are 50% overlapping. For each block, the encoder has the option to choose either a long window or 8 short windows to represent that block based on the audio characteristics of that block.

Figure 7:
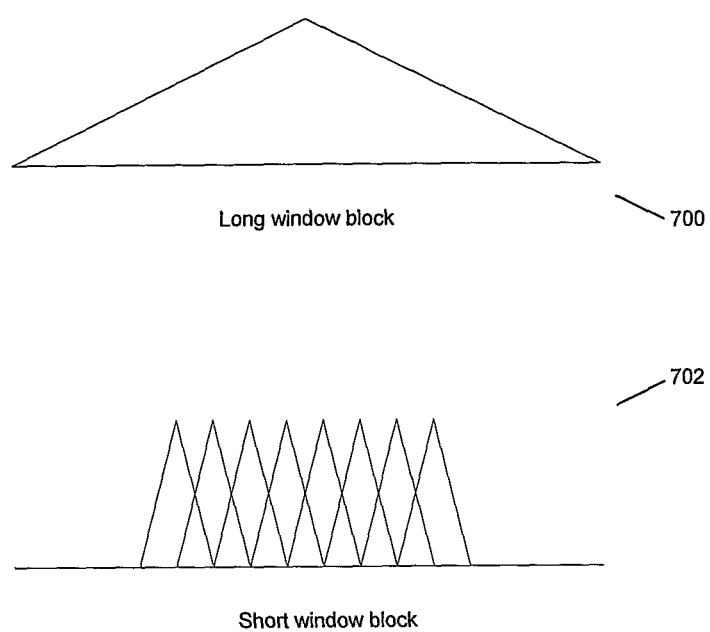
FIG. 7 shows schematic drawings illustrating a long window block and a short window block in an AAC encoded bitstream.

A graphic representation of a long window block 700 and a short window block 702 are illustrated in FIG. 7. The short window block 702 shows that neighbouring blocks are 50% overlapping.

However, from an audio feature extraction point of view, it is desirable that there is a uniform window size for every block so that consistency can be maintained for audio feature calculation.

In the example embodiment, based on the recognition that for most audio recordings and their encoded audio bitstreams, the number of short window blocks is relatively less than that of long window blocks, short window blocks are converted into long window blocks to unify the dimension of the MDCT spectral coefficients to achieve uniform size MDCT spectral coefficients. The detailed conversion procedure to convert MDCT spectral coefficients with different dimensions to uniform size MDCT spectral coefficients will now be described.

Figure 4:
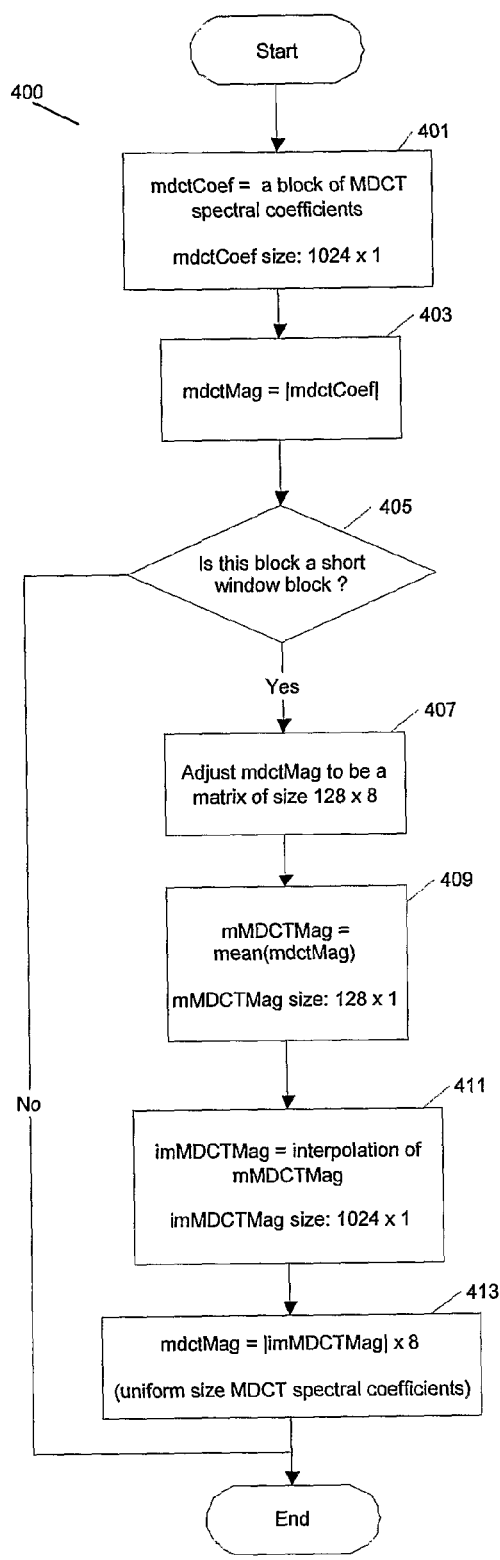
FIG. 4 shows a flow chart illustrating a conversion procedure to unify the dimension of the MDCT spectral coefficients of the long window blocks and short window blocks within an audio bitstream according to the example embodiments of the present invention.

FIG. 4 illustrates the conversion procedure 400 to unify the dimension of the MDCT spectral coefficients 309 of the long window blocks and short window blocks within the AAC bitstream 100.

At step 401, a block of MDCT spectral coefficients 309 is retrieved and stored in a variable mdctCoef. For the extraction of some audio features, only the spectral envelope (i.e. magnitude) is of interest. As such, the absolute values of the MDCT coefficients 309 are stored in a variable mdctMag at step 403.

At step 405, a test on whether the block is a short window block is performed. Despite the block type, there are always 1024 MDCT spectral coefficients in each block. If the block stored in mdctCoef is already a long window block, then no further processing is needed and the conversion procedure directly goes to end.

On the other hand, if the block stored in mdctCoef is a short window block, the size of mdctMag is adjusted to be 128×8 at step 407 because there are 8 short windows in a short window block and each window contains 128 coefficients.

After which, at step 409, the mean value across the 8 windows for each of the 128 coefficients is calculated and stored in mMDCTMag (also known as the mMDCTMag vector) as follows, $$mMDCTMag = \mathrm{mean}(mdctMag)$$

$$= \mathrm{mean}\left(\begin{bmatrix} c_{1,1} & c_{1,2} & \cdots & c_{1,8} \\ c_{2,1} & c_{2,2} & \cdots & c_{2,8} \\ \vdots & \vdots & \ddots & \vdots \\ c_{128,1} & c_{128,2} & \cdots & c_{128,8} \end{bmatrix}\right) = \begin{bmatrix} c'_1 \\ c'_2 \\ \vdots \\ c'_{128} \end{bmatrix}$$

The mean operation is taken along each row of the mdctMag matrix. For example, $$c'_1 = \mathrm{mean}([c_{1,1} c_{1,2} \ldots c_{1,8}]).$$

In the next step 411, interpolation operation is applied to the mMDCTMag vector to expand its dimension from 128 to 1024. The interpolation results are stored in imMDCTMag.

The interpolation method utilised by the example embodiment is not restricted to any particular type and depends on computation power restrictions and the particular application. For example, piecewise cubic Hermite interpolation, spline interpolation or the like may be used.

It is quite possible that negative values will reappear in imMDCTMag after interpolation, so absolute values have to be taken again over imMDCTMag. In order to match the magnitude level of the long window block, absolute values of imMDCTMag are hence multiplied by 8 and stored in mdctMag thereby overwriting the previous value of mdctMag at step 413.

The result of the conversion procedure 400 is a set of uniform window block size MDCT spectral coefficients (507 in FIG. 5) that is stored in mdctMag (1024×1 in size).

Figure 5:
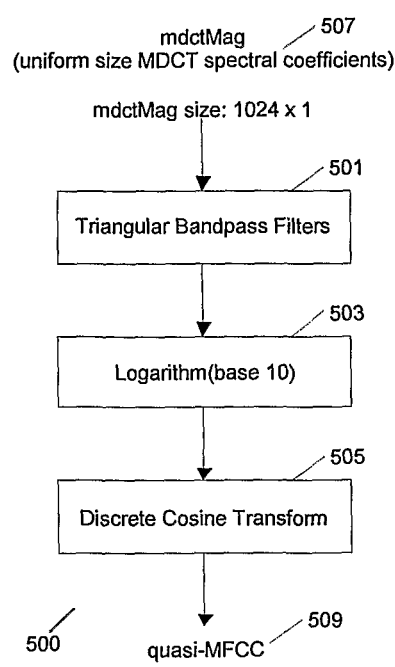
FIG. 5 shows a flow chart illustrating a procedure to calculate the audio feature, quasi-MFCC according to the example embodiments of the present invention.

FIG. 5 illustrates the procedure 500 to calculate the audio feature, quasi-MFCC 509, from mdctMag.

MFCC models the human auditory system that perceives sound logarithmically. For conventional MFCC, calculation starts from time domain audio signals obtained from full decoding of the AAC bitstream. For quasi-MFCC, calculations starts from uniform window block size MDCT spectral coefficients 507 i.e. mdctMag, which have very similar shape to the corresponding FFT spectral coefficients in a spectrum (frequency) plot.

At step 501, a block of uniform window block size MDCT spectral coefficients 507, mdctMag (1024×1 in size) is passed through a triangular bank-pass filter bank. These filters are positioned equally in the mel frequency axis. The mel frequency and the normal frequency has the following relationship, $$f_{mel} = 2595 \times \log_{10}(1+f/700)$$

In the example embodiment, the filter bank is constructed by 13 linearly spaced filters (133.33 Hz between centre frequencies) followed by 27 log spaced filters (separated by a factor of 1.0711703).

Then, at step 503, the logarithm (base 10) values of the filter outputs of step 501 are taken.

Lastly, Discrete Cosine Transform (DCT) is applied at step 505 to the logarithm outputs of the filters to obtain a L order MFCC. L is set as 12 in the example embodiment. The DCT formula is as follows, $$c_k = \frac{1}{N}\sum_{m=0}^{N-1} s_m \cos\left(\frac{k\pi(2m+1)}{2N}\right)$$

where N is the total number of filters, k=0, ..., L-1, $s_m$ is the logarithm output from the $m^{th}$ filter. The audio feature, quasi-MFCC 509, is given as:

$$\text{quasi-MFCC} = [c_0, c_1, \ldots c_{L-1}]$$

Therefore, the procedure 500 in FIG. 5 derives an audio feature, quasi-MFCC, that is similar to MFCC audio features from uniform window block size MDCT spectral coefficients 507.

It is appreciated that procedure 500 can be extended for calculation of other audio features that are previously derived from FFT spectral coefficients. In each of these cases, the input to the audio feature calculation is replaced with the absolute values of the uniform window block size MDCT spectral coefficients.

Figure 6:
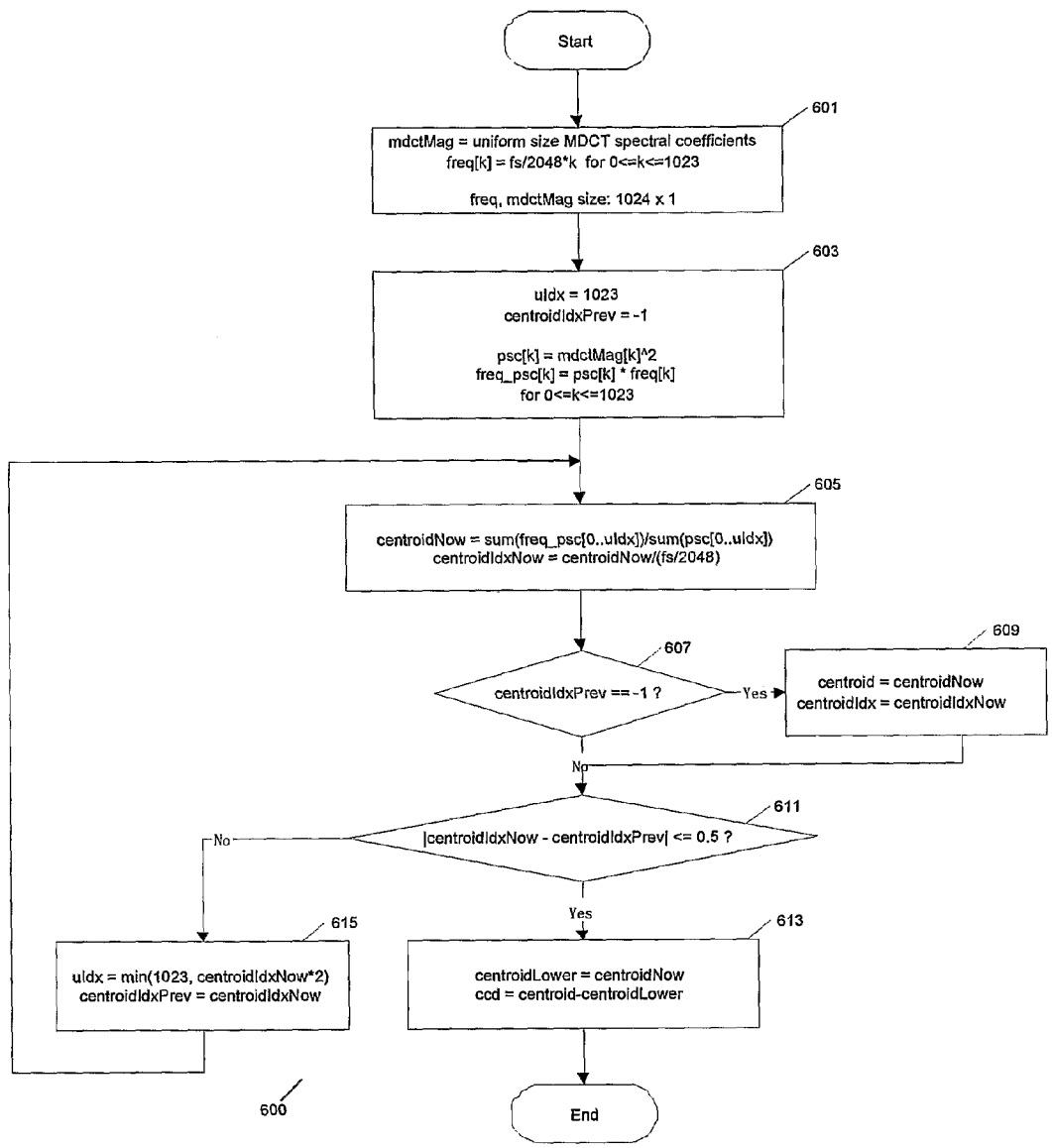
FIG. 6 shows a flow chart illustrating the procedure for calculating a Successive Lower Centroid and subsequently a derived feature Centroid-Centroid Deviation (CCD) according to the example embodiments of the present invention.

FIG. 6 illustrates the procedure 600 to calculate Successive Lower Centroid (SLC) and the derived feature Centroid-Centroid Deviation (CCD).

CCD is useful in identifying non-speech sounds. The general idea is that speech contains voiced and unvoiced portions. For voiced portion, the lower frequency part concentrates much of the energy. For unvoiced portion, the higher frequency part has much of the energy. While for music or other sounds produced by multiple sound sources, both lower and higher frequency parts have comparable energies. Thus when calculating the centroid of the frequency spectrum, if the upper bound of the spectrum range is kept lower, we are able to measure the lower centroid of the spectrum. CCD is the difference between the global spectrum centroid and the lower centroid. If CCD is large, it is quite likely that the sound is not speech. The audio feature, CCD, can hence be used to classify the audio content of the AAC bitstream.

For the calculation of Successive Lower Centroid, the same block of uniform window block size MDCT spectral coefficients (507 in FIG. 5) is firstly stored in a variable, mdctMag, with a same name as in procedure 500 of FIG. 5 and with mdctMag having 1024 coefficients at step 601. The corresponding frequency of each coefficient is further calculated for each coefficient and stored in a variable freq. The formula to calculate the frequency is as follows, $$freq[k] = \frac{fs}{2048}k$$

where fs is the sampling frequency of the audio stream, k is the frequency index ranging from 0 to 1023.

After that, at step 603, power spectrum coefficients, denoted as variable psc, are calculated using the following formula:

$$psc[k] = mdctMag[k]^2$$

The product of power spectrum coefficient and frequency is stored in a variable freq_psc as follows, $$freq\_psc[k] = freq[k] \cdot psc[k]$$

In the example embodiment, the initial value of the frequency index of the spectrum upper bound value, uIdx, is set to 1023 and the initial value of the frequency index of the previous centroid, denoted as centroidIdxPrev, is set to −1 at step 603.

At step 605, the current centroid, denoted as centroidNow, and its corresponding frequency index, denoted as centroidIdxNow, are then calculated as follows:

$$centroidNow = \frac{\sum_{k=0}^{uIdx} freq\_psc[k]}{\sum_{k=0}^{uIdx} psc[k]}$$

$$centroidIdxNow = \frac{centroidNow}{\frac{fs}{2048}}$$

Next, at step 607, centroidIdxPrev is tested to see if it is equal to −1.

If the value of centroidIdxPrev is −1, this means it is the first instance that the centroid is calculated. Therefore before performing the next step 611, centroidNow, is saved as the global spectrum centroid, denoted as centroid, and centroidIdxNow is saved in a variable, centroidIdx at step 609.

At step 611, a test is conducted to check whether the current centroid, centroidNow, has converged or not by checking the difference between the frequency index of the current centroid, centroidIdxNow, and that of the previous centroid, centroidIdxPrev., The difference is compared to a predefined threshold, for instance 0.5, as used in the example embodiment. This threshold value is may be any value between 0 to 1. The lesser the threshold value is, the higher the accuracy of convergence measurement. The actual threshold value depends on the application requirement and limitations from computation cost. The test at step 611 ensures that the spectrum range of the global spectrum centroid is reduced to a predefined range to become the Successive Lower Centroid.

If the difference is less than or equal to the threshold, the current centroid, centroidNow, has converged and it is saved in centroidLower, which represents the Successive Lower Centroid, at step 613. The corresponding Centroid-Centroid Difference, ccd is then given by, $$ccd = centroid - centroidLower$$

If the difference is still greater than the threshold, the frequency index of the spectrum upper bound, uIdx, is updated as follows at step 615, $$uIdx = centroidIdxNow \times 2$$

Of course, uIdx cannot exceed 1023 because mdctMag has only 1024 coefficients. Thus, $$uIdx = \min(1023, centroidIdxNow \times 2)$$

At the same time, centroidIdxPrev is updated with centroidIdxNow. The whole process will then repeat from steps 605 onwards to search for a new centroid, centroidNow, and the corresponding frequency index, centroidIdxNow, until the said difference is less than or equal to the predefined threshold.

The procedure 600 described above calculates CCD only for 1 block. In a segment (e.g. 1 second/segment) of audio signals, there are multiple blocks inside. In order to avoid the influence of large CCD values of certain blocks, the median CCD value of all the blocks is considered in the segment. If the median CCD value is larger than a threshold (e.g. 300 Hz), it is quite likely that the segment is non-speech.

Figure 8:
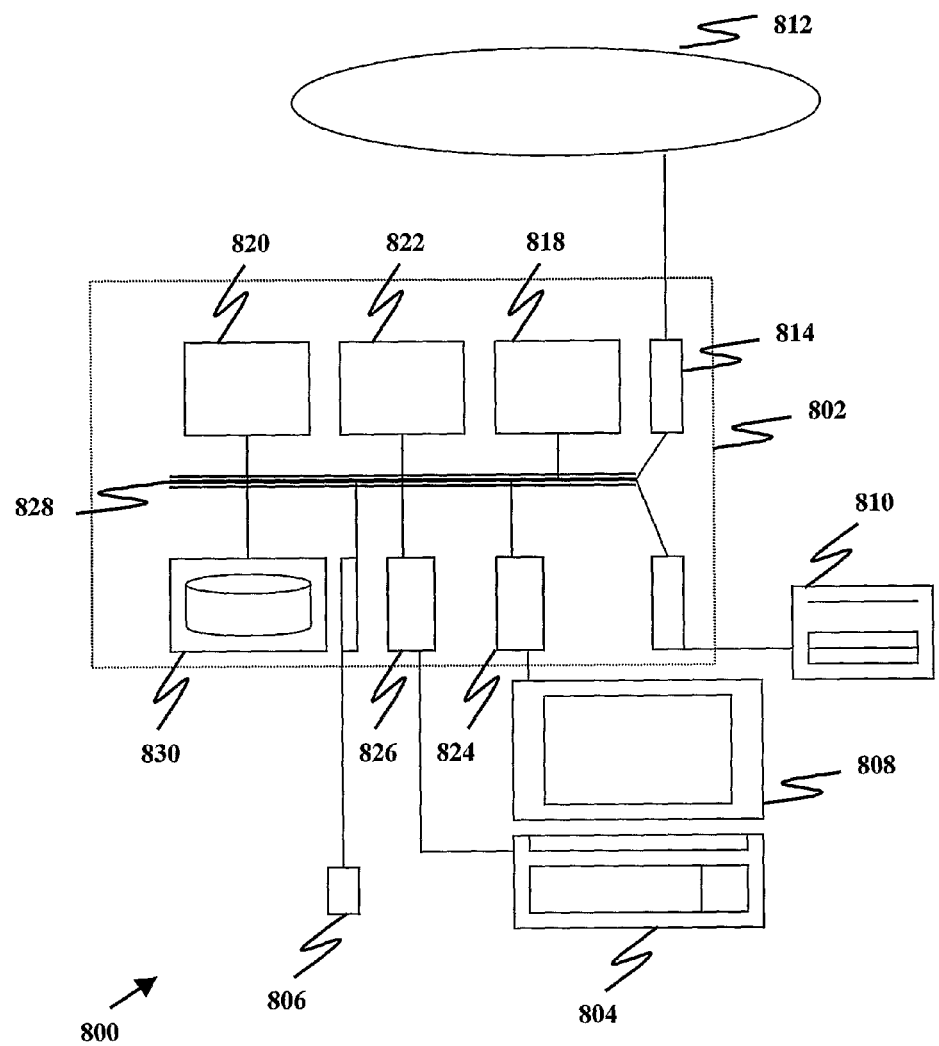
FIG. 8 illustrates a schematic drawing of a computer system for implementing the method and system according to the example embodiment.

The procedures described in the example embodiment are implemented in a computer system 800, schematically shown in FIG. 8. The procedures may be implemented as software, such as a computer program being executed within the computer system (which can be a palmtop, mobile phone, desktop computer, laptop or the like) 800, and instructing the computer system 800 to conduct the method of the example embodiment.

The computer system 800 comprises a computer module 802, input modules such as a keyboard 804 and mouse 806 and a plurality of output devices such as a display 808, and printer 810.

The computer module 802 is connected to a computer network 812 via a suitable transceiver device 814, to enable access to e.g. the Internet or other network systems such as Local Area Network (LAN) or Wide Area Network (WAN).

The computer module 802 in the example includes a processor 818, a Random Access Memory (RAM) 820 and a Read Only Memory (ROM) 822. The computer module 802 also includes a number of Input/Output (I/O) interfaces, for example I/O interface 824 to the display 808 (or where the display is located at a remote location), and I/O interface 826 to the keyboard 804.

The components of the computer module 802 typically communicate via an interconnected bus 828 and in a manner known to the person skilled in the relevant art.

The application program is typically supplied to the user of the computer system 800 encoded on a data storage medium such as a CD-ROM or flash memory device and read utilising a corresponding data storage medium drive of a data storage device 830. The application program is read and controlled in its execution by the processor 818. Intermediate storage of program data maybe accomplished using RAM 820.

Example embodiments of the present invention may have the following features and advantages.

Example embodiments of the present invention are capable of extracting audio features from encoded bitstream for an audio classification system. This is achieved by performing partial decoding instead of full decoding, which alleviates the computation cost of fully decoding encoded bitstream into time-domain. Useful audio features can be extracted based on uniform window block size spectral coefficients.

Example embodiments of the present invention may be applied in an audio classification system to classify a database of encoded audio from music or TV program, which are not tagged with metadata. Quasi-MFCC, Successive Lower Centroid and Centroid-Centroid Deviation derived based on MDCT spectral coefficients, may be utilised during audio classification to achieve high classification accuracy with low complexity. With less computation cost and effective feature extraction, example embodiments of the present invention can be used in real-time applications and in applications with high accuracy requirements.

Many modifications and other embodiments can be made to the system and its method by those skilled in the art having the understanding of the above described disclosure together with the drawings. Therefore, it is to be understood that the device and its utility is not to be limited to the above description contained herein only, and that possible modifications are to be included in the claims of the disclosure.

The invention claimed is:

1. A method for extracting audio features from an encoded bitstream for audio classification, the method comprising:
    partially decoding the encoded bitstream using a decoder to obtain spectral coefficients of the encoded bitstream for audio classification;
    obtaining uniform window block size spectral coefficients of the encoded bitstream by processing said spectral coefficients using a processor;
    extracting audio features based on the uniform window block spectral coefficients for audio classification; and
    classifying the encoded bitstream using the audio features,
    wherein the obtaining the uniform window block size spectral coefficients comprises representing a short window block in the encoded bitstream by a mean value of absolute spectral coefficients over all the short windows in said short window block and then expanding dimensions of short window block size spectral coefficients of said short window block of the encoded bitstream to dimensions of long window block size spectral coefficients of said short window block of the encoded bitstream so as to obtain uniform window block size spectral coefficients.

2. A method as claimed in claim 1, wherein the extracting of the audio features comprises:
    subjecting the uniform window block spectral coefficients to a filter bank; and
    applying a discrete cosine transform to extract quasi-Mel Frequency Cepstral Coefficients (quasi-MFCC).

3. A method as claimed in claim 1, wherein the obtaining the uniform window block size spectral coefficients comprises utilising interpolation techniques to expand dimensions of short window block size spectral coefficients to dimensions of long window block size spectral coefficients.

4. A method for extracting audio features from an encoded bitstream for audio classification, the method comprising:
  partially decoding the encoded bitstream using a decoder to obtain spectral coefficients of the encoded bitstream for audio classification;
  obtaining uniform window block size spectral coefficients of the encoded bitstream by processing said spectral coefficients using a processor;
  extracting audio features based on the uniform window block spectral coefficients for audio classification,
  classifying the encoded bitstream using the audio features, wherein the extracting of the audio features comprises:
    calculating a global spectrum centroid based on the uniform window block spectral coefficients; and
    deriving a Successive Lower Centroid (SLC) feature by reducing a spectrum range of the global spectrum centroid to a range based on a predefined convergence threshold.

5. A method as claimed in claim 4, wherein a Centroid-Centroid Deviation feature is calculated by taking a difference between the global spectrum centroid and the Successive Lower Centroid.

6. A method as claimed in claim 5, wherein the obtaining the uniform window block size spectral coefficients comprises representing a short window block in the encoded bitstream by a mean value of absolute spectral coefficients over all the short windows in said short window block.

7. A method as claimed in claim 6, wherein the obtaining the uniform window block size spectral coefficients comprises utilising interpolation techniques to expand dimensions of short window block size spectral coefficients to dimensions of long window block size spectral coefficients.

8. A system for extracting audio features from an encoded bitstream for audio classification, the system comprising:
  a decoder for partially decoding the encoded bitstream using a decoder to obtain spectral coefficients of the encoded bitstream for audio classification;
  a processor for obtaining uniform window block size spectral coefficients of the encoded bitstream by representing a short window block in the encoded bitstream by a mean value of absolute spectral coefficients over all the short windows in said short window block and then expanding dimensions of short window block size spectral coefficients of said short window block of the encoded bitstream to dimensions of long window block size spectral coefficients of said short window block of the encoded bitstream so as to obtain uniform window block size spectral coefficients;
  an audio feature extractor for extracting audio features based on the uniform window block spectral coefficients for audio classification; and
  a classifier for classifying the encoded bitstream using the audio features.

9. A system as claimed in claim 8, wherein the audio feature extractor comprises a filter bank for filtering the uniform window block spectral coefficients; and the processor applies discrete cosine transform to extract quasi-Mel Frequency Cepstral Coefficients (quasi-MFCC).

10. A system as claimed in claim 8, wherein the processor utilises interpolation techniques to expand dimensions of short window block size spectral coefficients to dimensions of long window block size spectral coefficients.

11. A system for extracting audio features from an encoded bitstream for audio classification, the system comprising:
  a decoder for partially decoding the encoded bitstream using a decoder to obtain spectral coefficients of the encoded bitstream for audio classification;
  a processor for obtaining uniform window block size spectral coefficients of the encoded bitstream by processing said spectral coefficients;
  an audio feature extractor for extracting audio features based on the uniform window block spectral coefficients for audio classification; and
  a classifier for classifying the encoded bitstream using the audio features,
  wherein the audio feature extractor calculates a global spectrum centroid based on the uniform window block spectral coefficients and derives a Successive Lower Centroid (SLC) feature by reducing a spectrum range of the global spectrum centroid to a range based on a predefined convergence threshold.

12. A system as claimed in claim 11, wherein the audio feature extractor further calculates a Centroid-Centroid Deviation feature by taking a difference between the global spectrum centroid and the Successive Lower Centroid.

13. A system as claimed in claim 12, wherein the processor represents a short window block in the encoded bitstream is represented by a mean value of absolute spectral coefficients over all short windows in said short window block.

14. A system as claimed in claim 13, wherein the processor utilises interpolation techniques to expand dimensions of short window block size spectral coefficients to dimensions of long window block size spectral coefficients.

* * * * *